United States Patent Office 3,414,631
Patented Dec. 3, 1968

3,414,631
OXYDEHYDROGENATION PROCESS
Robert K. Grasselli, Garfield Heights, and James L. Callahan, Bedford Heights, Ohio, assignors to The Standard Oil Company, Cleveland, Ohio, a corporation of Ohio
No Drawing. Filed June 10, 1965, Ser. No. 463,036
13 Claims. (Cl. 260—680)

ABSTRACT OF THE DISCLOSURE

Conjugated dienes, such as butadiene, are prepared from monoolefins, such as butene-1, by oxydehydrogenation over a catalyst, such as $Ni_{10.5}FeBi_{0.5}Sb_{0.5}Mo_{12}O_{55}$.

---

This invention relates to a process for the conversion of monoolefins to diolefins by means of a catalytic oxydehydrogenation and more particularly pertains to the catalytic oxydehydrogenation of monoolefins having from 4 to 10 carbon atoms to conjugated dienes having from 4 to 10 carbon atoms in the presence of a bismuth molybate catalyst also containing the oxides of at least two transition metals of Group VIII of the Mendeleef Periodic Table of the Elements.

The catalysts preferred in this invention are composed of bismuth molybdate plus the oxides of at least two transition metals of Group VIII and preferably one of these transition metals is iron. Part of the bismuth in the bismuth molybdate may be replaced by one or more of antimony, tin, copper or arsenic. The more preferred catalysts are composed of bismuth phosphomolybdate plus iron oxide and the oxide of at least one transition metal of Group VIII and part of the bismuth may be replaced by one or more of antimony, tin, copper or arsenic.

In the process of the invention aliphatic or cyclic monoolefinic hydrocarbons containing from four to ten carbon atoms are oxydehydrogenated to the corresponding diolefin or aromatic compound. More particularly, this invention is concerned with the conversion of monoolefins having a straight chain of at least four carbon atoms to conjugated diolefins and is most particularly concerned with the formation of butadiene-1,3 and isoprene from the normal butenes and the isopentenes, respectively.

This process involves passing a monoolefin and molecular oxygen, such as air, in the presence or absence of a diluent such as steam, carbon dioxide, nitrogen or other inert gas at a moderate temperature over a catalyst of the following composition

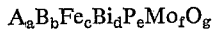

$$A_aB_bFe_cBi_dP_eMo_fO_g$$

wherein A is a transition metal of Group VIII of the Mendeleef Periodic Table and B is at least one of antimony, tin, copper and arsenic wherein $a$ is a number from 0.1 to 12, $b$ is a number from 0 to 12, $c$ is a number from 0.1 to 12, $d$ is a number from 0.1 to 12, $e$ is a number from 0 to 12, $f$ is a number from 6 to 12 and $g$ is a number determined by the valence requirements of A, B, Fe, Bi, P and Mo. It is preferred that the elements represented by A, B, Fe, Bi, P and Mo be at or near their highest oxidation states in the instant process. Although the molybdenum in the foregoing catalyst composition can be replaced completely or partially by tungsten to produce acceptable results in the present process, it is preferred that molybdenum alone be employed. A specific illustration of an operative catalyst within the scope of the present invention is the composition $Ni_{10.5}FeBi_{0.5}Sb_{0.5}Mo_{12}O_{55}$ which is supported on a silica support.

The catalysts embodied herein are unexpectedly good oxydehydrogenation catalysts. With the above-mentioned specific catalyst composition, 82% of butene-1 was converted to butadiene-1,3 with a selectivity of 92%. In addition to their high efficiency in producing the desired reaction, the catalysts embodied herein are effective at unexpectedly low reaction temperatures which is a decided advantage. The high activity of these catalysts in such a relatively low temperature range is surprising in view of the disclosure in U.S. Patent No. 2,991,320 which describes the preparation of butadiene using a bismuth phosphomolybdate catalyst in the temperature range of 400 to 538° F. Furthermore, the presence of iron and a second Group VIII transition metal element in the catalyst of the present process more than triples the conversion of butene-1 to butadiene-1,3 over that obtained with a catalyst composition containing only one Group VIII element as disclosed in U.S. Patent No. 3,110,746. With the best disclosed catalyst of U.S. Patent No. 3,110,746, a bismuth, iron, molybdenum oxide, a 28% conversion of butene-1 to butadiene-1,3 was obtained under reaction conditions employed in the instant process, whereas an 82% conversion was obtained using the catalyst $Ni_{10.5}FeBi_{0.5}Sb_{0.5}Mo_{12}O_{55}$ under the same conditions.

The catalysts useful in the instant process may be used alone or supported on or impregnated in a carrier material. Suitable carrier materials include silica, alumina, thoria, zirconia, titania, boron phosphate, silicon carbide, pumice, diatomaceous earth, clay and the like. In general, this support may be employed in amounts less than 95% by weight of the final catalyst composition.

The catalysts embodied herein may be calcined to produce desirable physical properties such as attrition resistance, optimum surface area and particle size. It is generally preferred that the calcined catalyst be further heat-treated in the presence of oxygen and at a temperature of above 500° F. but below a temperature deleterious to the catalyst.

The catalysts of this invention are active at temperatures as low as 200° C., although their redox stability is more favorable at slightly higher temperatures. At 250° C. and higher, the catalysts embodied in this invention exhibit very stable and active properties.

The optimum temperature range for converting butene-1 to butadiene-1,3 by the instant process is from 250 to 325° C. and there is no apparent advantage in operating at temperatures much in excess of 400° C.

The pressure at which the instant process is usually conducted is about atmospheric although pressures of from slightly below atmospheric up to and above 3 atmospheres are operable.

The apparent contact time employed in the instant process may be within the range of 0.1 to 50 seconds, and for good selectivity and yields a contact time of from 1 to 15 seconds is preferred.

Molar ratios of olefin to air and olefin to steam may vary from about 1:1 to 1:75. Ratios near the higher limit usually make for poor selectivity and ratios near the lower limit tend to decrease catalyst activity. The preferred molar ratios of olefin to oxygen and to steam are in the range of about 1:0.5 to 1:30.

The catalysts employed in the examples of this invention were prepared by dissolving soluble salts of the respective metals in water or acid and heating the mixture with an aqueous silica dispersion until a gel formed. After gelation, the resulting mixture was heated at 130° C. until dry. The catalyst was heated at about 300° C. for 4 hours and was calcined at 800° F. in air for an additional 24 hours. In some instances, the catalysts were also further treated in air for 3 hours at 1200° F.

The reactor employed for the conversion of monoolefin to diolefin in this and the succeeding examples was a standard reactor with a fixed catalyst bed. The catalyst volume was 5 cc. and the catalyst mesh size was 20 to 35 per inch. The gases were metered with rotameters.

The steam was injected in the form of water through an electrically powered syringe device. The reaction products were analyzed by means of a gas chromatograph. The column employed was a 5 mm., 25% $\beta,\beta'$-oxydipropionitrile on 30 to 60 mesh firebrick. Butenes and butadiene were analyzed by passing the reactor effluent gases over a solid drying agent and then into a gas sampling valve which was opened periodically for gas chromatographic analysis. Isopentenes and isoprene were analyzed by passing the reactor effluent for a fixed period of time into a microscrubber containing 5 cc. of methyl cyclohexane cooled externally by ice water. A 24 microliter aliquot of this solution was then injected into a chromatographic column containing $\beta,\beta'$ - oxypropionitrile. The waste gases, carbon dioxide and carbon monoxide, were analyzed by a standard Fischer chromatographic analysis. The instant process can also be carried out in a fluidized bed reactor.

The conjugated diene and other products produced by the process of this invention can be isolated and purified by procedures known to those skilled in the art such as the procedures given in the copending U.S. patent application of J. L. Callahan, B. Gertisser and R. K. Grasselli, Ser. No. 201,330, filed June 11, 1962, now U.S. Patent No. 3,260,768.

Catalysts used in the examples were prepared as follows:

(A) A catalyst composed of 82.5% by weight of $Ni_{10.5}FeBiPMo_{12}O_{57.25}$ and 17.5% by weight of $SiO_2$ was prepared by mixing the following materials in the order given:

| | G. |
|---|---|
| 30% by weight dispersion of silica in water | 116.4 |
| 85% $H_3PO_4$ | 6.4 |
| $(NH_4)_6Mo_7O_{24} \cdot 4H_2O$ dissolved in water | 117.8 |
| $Bi(NO_3)_3 \cdot 5H_2O$ dissolved in 50 cc. of a 25% by volume $HNO_3$-$H_2O$ solution | 26.9 |
| $Fe(NO_3)_3 \cdot 9H_2O$ dissolved in water | 22.4 |
| $Ni(NO_3)_2 \cdot 6H_2O$ dissolved in water | 169.0 |

The mixture was heated on a hot plate with constant stirring until a gel formed and was then dried in an air drying oven at 100° C. for 18 hours. The catalyst was then heated at 300° C. for 4½ hours and then at 800° F. for 23 hours in the presence of air.

(B) A catalyst composed of 82.5% by weight of $Ni_{10.5}FeBi_{0.5}Sb_{0.5}Mo_{12}O_{55}$ and 17.5% by weight of $SiO_2$ was prepared by mixing the following ingredients in the order given:

| | G. |
|---|---|
| Antimony metal which was oxidized in about 20 ml. of concentrated $HNO_3$ | 3.4 |
| 30% by weight dispersion of silica in water | 116.4 |
| $(NH_4)_6Mo_7O_{24} \cdot 4H_2O$ dissolved in water | 117.8 |
| $Bi(NO_3)_3 \cdot 5H_2O$ dissolved in 25% $HNO_3$-$H_2O$ | 13.4 |
| $Fe(NO_3)_3 \cdot 9H_2O$ dissolved in water | 22.4 |
| $Ni(NO_3)_2 \cdot 6H_2O$ dissolved in water | 169.0 |

The total volume of approximately 800 cc. was reduced to 400 cc. when the mixture gelled. The mixture was placed in an air drying oven at about 100° C., heat treated in air at 570° F. for 4 hours and then at 800° F. for 23 hours.

(C) A portion of Catalyst B above was heat treated in the presence of air for 3 hours at 1200° F.

(D) A catalyst composed of 82.5% by weight of $Co_{10.5}FeBiPMo_{12}O_{57.25}$ and 17.5% by weight of $SiO_2$ was prepared by mixing the following ingredients in the order given:

| | G. |
|---|---|
| 30% by weight dispersion of silica in water | 116.4 |
| 85% aqueous solution of $H_3PO_4$ | 6.4 |
| $(NH_4)_6Mo_7O_{24} \cdot 4H_2O$ | 117.8 |
| $Bi(NO_3)_3 \cdot 5H_2O$ | 26.9 |
| $Fe(NO_3)_3 \cdot 9H_2O$ | 22.4 |
| $Co(NO_3)_2 \cdot 6H_2O$ | 169.6 |

The total volume of approximately 800 cc. was evaporated to about 400 cc. at which point the mixture began to gel. The resulting gel was placed in an oven at about 100° C. for a short time; it was then heat treated at 570° F. in air for 4 hours and then at 800° F. for 23 hours.

(E) A portion of the catalyst disclosed in D above was also heated in air for 3 hours at 1200° F.

(F) A catalyst having the composition 82.5% by weight of $Ni_8FeBiPMo_{12}O_{53.5}$ and 17.5% by weight of $SiO_2$ was prepared using the proper ingredients by the procedure of A above and the final catalyst was heat treated in air for 3 hours at 1200° F.

(G) A catalyst having the composition 82.5% by weight of $Ni_6FeBiPMo_{12}O_{50.5}$ and 17.5% by weight of $SiO_2$ was prepared by the procedure given in F above.

(H) A catalyst having the composition 82.5% by weight of $Ni_{10.5}BiPMo_{12}O_{55.75}$ and 17.5% by weight of $SiO_2$ which is outside the scope of the present invention was prepared by the procedure of G above.

(I) A catalyst having the composition 82.5% by weight of $Ni_{10.5}BiPMo_{12}O_{55.75}$ and 17.5% by weight $SiO_2$ which is also outside the scope of the present invention was prepared by the procedure outlined in A.

(J) A catalyst having the composition 82.5% by weight of $Ni_{5.25}Co_{5.25}FeBiPMo_{12}O_{57.25}$ and 17.5% by weight $SiO_2$ was prepared by the procedure given in F.

(K) A catalyst having the composition 82.5% by weight of $Ni_{10.5}CoBiPMo_{12}O_{57.25}$ and 17.5% by weight of $SiO_2$ which is outside the scope of the present invention was prepared by the procedure of F.

(L) A catalyst having the composition 82.5% by weight of $Ni_{10.5}FeBi_{0.5}Sb_{0.5}PMo_{12}O_{57.5}$ and 17.5% by weight of $SiO_2$ prepared according to the procedure of B above was further heat treated at 1200° F. for three hours.

(M) A catalyst having the composition 82.5% by weight of $Ni_{10.5}FeSbMo_{12}O_{55.25}$ and 17.5% by weight of $SiO_2$ which is outside the scope of the present invention was prepared by the procedure of L.

(N) A catalyst having the composition 82.5% by weight of $Ni_{10.5}FeBiPW_{12}O_{57.25}$ and 17.5% by weight of $SiO_2$ was prepared by the procedure of A.

(O) A catalyst having the composition 82.5% by weight of $Ni_{10.5}UBiPMo_{12}O_{58.75}$ and 17.5% by weight of $SiO_2$ which is outside the scope of this invention was prepared by the procedure of F.

(P) A catalyst having the composition 82.5% by weight of $Ni_{10.5}SnBiPMo_{12}O_{57.75}$ and 17.5% by weight of $SiO_2$ which is not within the scope of the present invention was prepared by procedure F.

(Q) A catalyst having the composition 82.5% by weight of $Ni_{10.5}MnBiPMo_{12}O_{57.25}$ and 17.5% by weight of $SiO_2$ which is outside the scope of the present invention was prepared by the procedure of A.

(R) A catalyst having the composition 82.5% by weight of $Ni_{10.5}VBiPMo_{12}O_{58.25}$ and 17.5% by weight of $SiO_2$ which is outside the scope of the present invention was prepared by the procedure of A.

(S) A catalyst having the composition 82.5% by weight of $Ni_{10.5}SnBiPMo_{12}O_{57.75}$ and 17.5% by weight of $SiO_2$ which is outside the scope of the present invention was prepared by procedure A.

(T) A catalyst having the composition 50% by weight of $Bi_9PMo_{12}O_{48}$ and 50% by weight of $SiO_2$ which is outside the scope of this invention was prepared by the procedure given in Example I of U.S. Patent No. 2,904,580.

(U) A catalyst composed of the oxides of bismuth, iron and molybdenum was prepared by the procedure given in Example VII of U.S. Patent No. 3,110,746.

(V) A portion of catalyst A was heat treated at 1070° F. for three hours.

(W) A portion of catalyst A was heat treated at 1200° F. for three hours.

(X) A catalyst having the composition 82.5% by weight of $Fe_{11.5}BiPMo_{12}O_{57.25}$ and 17.5% by weight of $SiO_2$ which is outside the scope of the present invention was prepared by the procedure of F.

(Y) A catalyst having the composition 82.5% by weight of $Ni_{5.75}Fe_{5.75}BiPMo_{12}O_{57.25}$ and 17.5% by weight of $SiO_2$ was prepared by procedure F.

(Z) A catalyst having the composition 82.5% by weight of $Ni_{3.5}Co_{3.5}Fe_{3.5}BiPMo_{12}O_{57.25}$ and 17.5% by weight of $SiO_2$ was prepared by procedure F.

EXAMPLE I

The activity of the foregoing catalysts in the oxidative dehydrogenation of butene-1 to butadiene-1,3 is shown in Table I. The reaction conditions are shown and the feed was composed of butene-1, air and water (steam) in the molar ratio of 1:20:21.4, respectively. The catalyst particle size was from 20–35 mesh and the catalyst volume was 5 cc. The reactor was a stainless steel microreactor having a capacity of about 8 cc.

EXAMPLE II

The procedure of Example I was followed and the molar ratios of butene-1 to air to water were varied. The contact time was 2.3 seconds and the results of these experiments are shown in Table II.

in place of butene-1 and the molar ratio of isopentene to air to water was 1:20:20, respectively.

TABLE I

| Catalyst | Contact time (seconds) | Reaction temp., °C. | Percent conversion to butadiene | Percent selectivity to butadiene |
|---|---|---|---|---|
| A | 2.3 | 300 | 44.8 | 87 |
| A | 2.4 | 271 | 58.7 | 97 |
| A | 2.5 | 243 | 48.2 | 94 |
| V | 2.4 | 271 | 49.0 | 93 |
| W | 2.3 | 300 | 79.9 | 97 |
| F | 2.3 | 300 | 31.7 | 97 |
| G | 2.3 | 300 | 31.4 | 96 |
| H | 2.3 | 300 | 2.2 | 100 |
| I | 2.3 | 300 | 4.7 | 57.4 |
| J | 2.3 | 300 | 70.0 | 99 |
| K | 2.3 | 300 | 2.1 | 100 |
| D | 2.1 | 347 | 1.7 | 2 |
| D | 2.3 | 300 | 4.0 | 14 |
| E | 2.3 | 300 | 50.0 | 98 |
| L | 2.3 | 300 | 34.7 | 92 |
| B | 2.3 | 300 | 81.9 | 92 |
| M | 2.3 | 300 | 1.9 | 27 |
| N | 2.1 | 347 | 16.7 | 69 |
| O | 2.3 | 300 | 5.2 | 91.4 |
| P | 2.3 | 300 | 3.3 | 27.5 |
| Q | 2.3 | 300 | 4.7 | 39 |
| R | 2.3 | 300 | 4.7 | 28.2 |
| S | 2.3 | 300 | 2.3 | 9.6 |
| T | 2.3 | 300 | 5.8 | 83 |
| U | 2.3 | 300 | 28.2 | 56 |

TABLE II

| Catalyst | Reaction temp.,° C. | Butene-1/air/H₂O | Contact time (seconds) | Percent conversion to butadiene | Percent selectivity to butadiene |
|---|---|---|---|---|---|
| A | 300 | 1/10/10.9 | 4.6 | 17.9 | 70 |
| A | 271 | 1/20/21.4 | 2.4 | 58.7 | 97 |
| A | 271 | 1/20/0/20N₂ | 2.4 | 69.5 | 98 |
| A | 271 | 1/10/31.2 | 2.4 | 55.6 | 94 |
| A | 243 | 1/20/21.4 | 2.5 | 48.2 | 94 |
| W | 300 | 1/20/21.4 | 2.3 | 79.9 | 97 |
| W | 300 | 1/10/16.7 | 2.8 | 78.8 | 99 |
| W | 271 | 1/20/59.6 | 2.4 | 65.1 | 98 |

EXAMPLE III

The procedure of Example I was repeated using catalysts which had been heat treated at 800° F. and at 1200° F. It can be seen from the results reported in Table III that the more effective catalysts under the conditions employed are those which were heat treated at a temperature above 800° F.

EXAMPLE IV

The procedure of Example I was repeated except that butene-2 composed of 82% trans- and 18% cis-butene-2 was used in place of butene-1 in the feed. The results are given in Table IV.

EXAMPLE V

The procedure of Example I was repeated except that the isopentenes shown in Table V were used in the feed

TABLE III

| Catalyst | Reaction temp.,° C. | Percent conversion to butadiene | Percent selectivity to butadiene |
|---|---|---|---|
| X | 300 | 5.0 | 100 |
| Y | 300 | 83.1 | 98 |
| A | 300 | 44.8 | 87 |
| W | 300 | 79.9 | 97 |
| I | 300 | 4.7 | 57 |
| H | 300 | 2.2 | 100 |
| Z | 300 | 77.4 | 98 |

TABLE IV

| Catalyst | Contact time (seconds) | Reaction temp.,° C. | Percent conversion to butadiene | Percent selectivity to butadiene |
|---|---|---|---|---|
| A | 2.3 | 300 | 61.8 | 93 |
| W | 2.1 | 347 | 62.0 | 81 |
| C | 2.3 | 300 | 43.0 | 92 |
| E | 2.1 | 347 | 29.4 | 97 |

TABLE V

| Catalyst | Olefin in feed | Contact time (seconds) | Reaction temp.,° C. | Percent conversion to isoprene | Percent selectivity to isoprene |
|---|---|---|---|---|---|
| A | 2-me-butene-2 | 2.3 | 300 | 2.2 | 39 |
| A | 2-me-butene-1 | 2.3 | 300 | 3.8 | 28 |
| A | 3-me-butene-1 | 2.3 | 300 | 6.0 | 63 |
| A | do | 2.1 | 350 | 21.9 | 39 |
| W | 2-me-butene-1 | 2.3 | 300 | 2.3 | 79 |
| W | 3-me-butene-1 | 2.1 | 350 | 17.6 | 43 |
| B | do | 2.3 | 300 | 21.4 | 64 |
| B | do | 2.2 | 325 | 28.9 | 73 |
| B | do | 2.1 | 350 | 31.8 | 40 |
| C | do | 2.1 | 350 | 10.5 | 30 |

We claim:
1. The process for conversion of a monoolefin having from 4 to 10 carbon atoms and having a straight chain of at least four carbon atoms to a conjugated diene having from 4 to 10 carbon atoms comprising contacting said monoolefin with molecular oxygen over a catalyst having the composition $A_aB_bFe_cBi_dP_eMo_fO_g$ wherein A is nickel or a combination of nickel and cobalt, B is at least one member selected from the group consisting of antimony, tin, copper and arsenic, $a$ is a number from 0.1 to 12, $b$ is a number from 0 to 12, $c$ is a number from 0.1 to 12, $d$ is a number from 0.1 to 12, $e$ is a number of from 0 to 12, $f$ is a number from 6 to 12 and $g$ is a number determined by the valence requirements of A, B, Fe, Bi, P and Mo at a temperature of from about 200° C. to about 400° C. at a pressure of from about one to three atmospheres.

2. The process of claim 1 wherein the molar ratios of monoolefin to molecular oxygen are from 1:0.5 to 1:30.

3. The process of claim 2 wherein the molecular oxygen is in the form of air and steam is included.

4. The process of claim 3 wherein the contact time is within the range of 0.1 to 50 seconds.

5. The process of claim 4 wherein A is nickel.

6. The process of claim 4 wherein A is a combination of nickel and cobalt.

7. The process of claim 4 wherein B is antimony and $b$ is not zero.

8. The process of claim 4 wherein the monoolefin is butene-1 and the conjugated diene is butadiene-1,3.

9. The process of claim 4 wherein the monoolefin is butene-2 and the conjugated diene is butadiene-1,3.

10. The process of claim 4 wherein the monoolefin is a mixture of butene-1 and butene-2 and the conjugated diene is butadiene-1,3.

11. The process of claim 4 wherein the monoolefin is 3-methyl-butene-1 and the conjugated diene is isoprene.

12. The process of claim 4 wherein the monoolefin is 2-methyl-butene-2 and the conjugated diene is isoprene.

13. The process of claim 4 wherein the monoolefin is 2-methyl-butene-1 and the conjugated diene is isoprene.

References Cited
UNITED STATES PATENTS

| | | |
|---|---|---|
| 3,110,746 | 11/1963 | Voge et al. |
| 3,159,688 | 12/1964 | Jennings et al. |
| 3,186,955 | 6/1965 | Callahan et al. |

PAUL M. COUGHLAN, Jr., *Primary Examiner.*